United States Patent [19]

Greer

[11] 4,056,127
[45] Nov. 1, 1977

[54] ACCUMULATOR WITH OPEN ENDED SHELL

[75] Inventor: Edward M. Greer, Beverly Hills, Calif.

[73] Assignee: EMG Hydraulics, Inc., Santa Monica, Calif.

[21] Appl. No.: 681,788

[22] Filed: Apr. 30, 1976

[51] Int. Cl.² .............................................. F16L 55/04
[52] U.S. Cl. .................................................. 138/30
[58] Field of Search ........................... 138/30, 31, 26; 137/538

[56] References Cited

U.S. PATENT DOCUMENTS

| | | | |
|---|---|---|---|
| 3,439,712 | 4/1969 | Mercier | 138/30 |
| 3,486,530 | 12/1969 | Mercier | 138/30 |
| 3,830,259 | 8/1974 | Mercier | 138/30 |
| 3,907,000 | 9/1975 | Carr | 138/30 |
| 3,941,032 | 3/1976 | Clerk | 138/30 |

Primary Examiner—Richard E. Aegerter
Assistant Examiner—L. Footland
Attorney, Agent, or Firm—Keith D. Beecher

[57] ABSTRACT

An open-ended accumulator is provided which may be constructed to be of a relatively large size, for example, in the 15-25 gallon range, and to be of relatively high pressure of the order, for example, of 5,000 psi. The accumulator is constructed so that its internal bladder can be replaced from one end of the shell without the need to remove the accumulator from the equipment in which it is installed. The accumulator includes a forged cap which is contoured to accept the rim of a thimble-shaped bladder within the shell, the cap being fitted within the open end of the shell. A segmented wedge-shaped tapered ring retains the cap in the shell. As outer plate may also be provided to permit the accumulator to be mounted under water without the water pressure tending to force the cap into the interior of the shell. The accumulator also includes a unique plug and poppet assembly in the liquid port at the opposite end of the shell which is constructed so that no part thereof can be dismantled so long as the accumulator contains a precharge.

8 Claims, 4 Drawing Figures

ACCUMULATOR WITH OPEN ENDED SHELL

BACKGROUND OF THE INVENTION

Pressure accumulators are widely used in many types of hydraulic systems. One type of pressure accumulator comprises a thimble-shaped flexible bladder mounted in a rigid shell, the bladder serving to separate the interior of the shell into two separate compartments which are sealed from one another. A first valved port is provided at one end of the shell in communication with one of the compartments which is termed the "liquid compartment", and a second valved port is provided at the other end of the shell, termed the "valved gas precharge port", is communication with the other compartment which is termed the "gas precharge compartment".

A compressible gas, such as nitrogen, is permanently charged and compressed under high pressure and introduced through the gas precharge port into the gas compartment of the accumulator. Then, an incompressible hydraulic liquid under high pressure is pumped through the valved liquid port into the liquid compartment. The flexible bladder is gradually forced into the gas compartment as the liquid is pumped into the liquid compartment, thereby compressing the gas in the gas compartment until a balanced higher pressure is reached in both compartments. In this way, energy is stored or absorbed into the gas compartment of the accumulator, and this energy acts as a spring to force the imcompressible hydraulic liquid out through the liquid port, thereby causing the hydraulic liquid to do useful work.

It is the usual practice to provide a spring-loaded poppet in the liquid port of the accumulator to prevent the bladder from extruding out through the liquid port. Under normal conditions this poppet valve is held open by a spring, and it is closed by the action of the bladder engaging the poppet after all of the liquid has been expelled from the liquid compartment thus preventing the gas precharge pressure from forcing the bladder out through the liquid port.

In the accumulator of the present invention, the gas precharge compartment is adjacent the cap at the open end of the shell, and the valved gas precharge port is mounted in the cap. A thimble-shaped flexible bladder is provided in the shell, and the mouth of the bladder is sealed to the cap, as will be described. This bladder separates the gas precharge compartment from the liquid compartment.

As mentioned above, the spring-loaded poppet valve in the liquid port at the other end of the shell has a unique construction, in that it is impossible to disassemble the valve so long as a precharge exists in the gas precharge compartment within the shell. This constitutes an important safety factor.

DETAILED DESCRIPTION OF THE ILLUSTRATED EMBODIMENT

Figure 1:
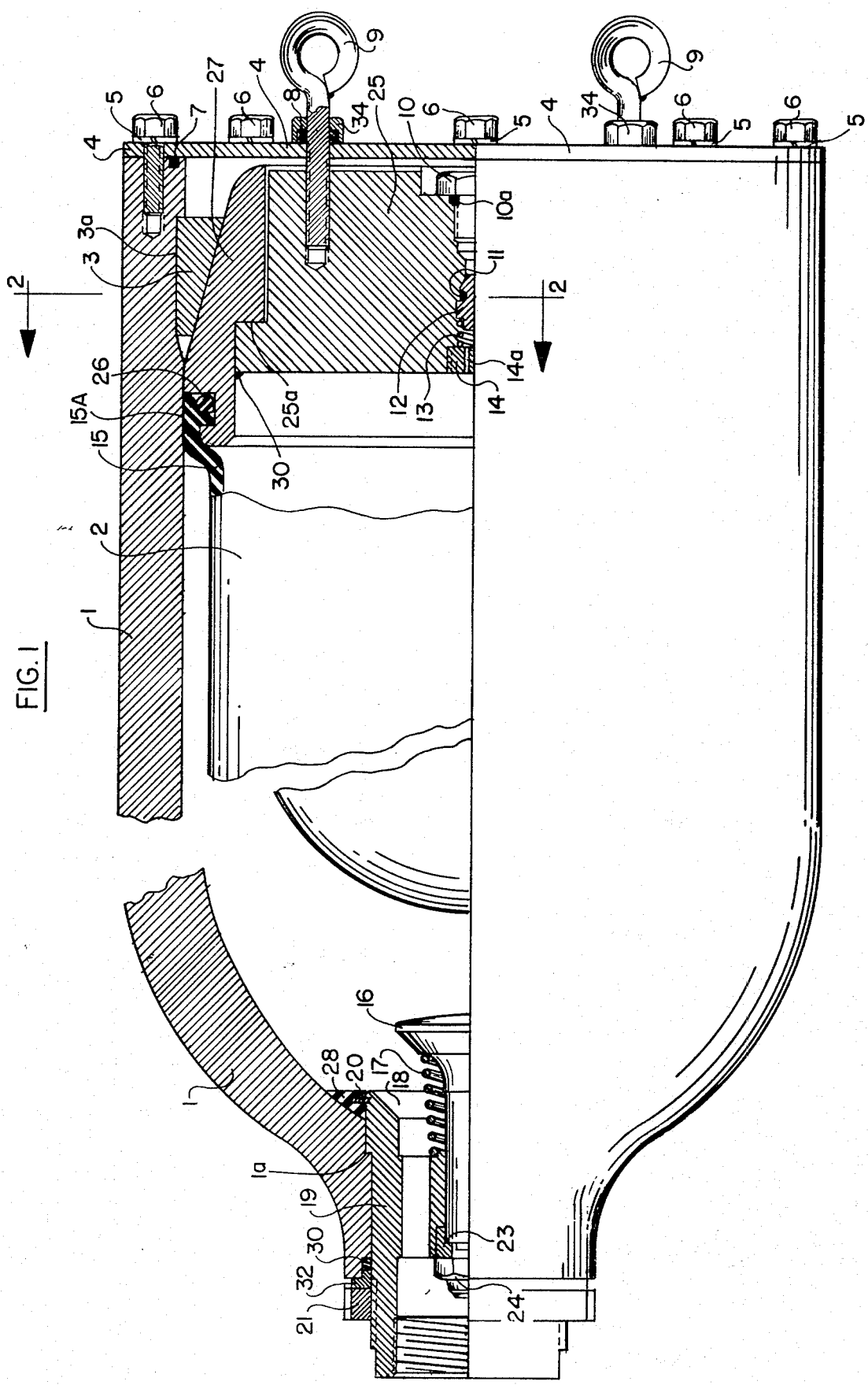
FIG. 1 is a side section of an accumulator constructed to incorporate the structure features of one embodiment of the invention.

The pessure accumulator illustrated in the drawings includes a rigid shell 1 having an open end at the right-hand end in FIG. 1, and having a port formed in the left-hand end in FIG. 1. A flexible thimble-shaped bladder 2, formed of rubber-like material, is mounted within the shell and the bladder has a rim 15 around its mouth which forms a seal between the inner peripheral surface of the shell 15A, and an annular ring member 27. An annular compression O ring 26, made of flexible material slightly harder than the rubber-like material of which the bladder tube is made, is mounted at the lower right hand corner of the annular groove in the annular ring 27. This ring is larger in the diameter than the gap provided between the bladder rim 15 and the groove in the annular ring 27, so that it will press the annular rim 15 of the bladder in outward compression against surface 15A forcing a seal. This annular ring 27 has a shoulder which engages with a shoulder 25A of a cap 25. The cap 25, and annular ring member 27, are fitted into the shell 1, and are held in place by a tapered locking ring 3. The annular ring 27, and the cap 25, are brazed or welded together, as at 30, to prevent loss of gas.

Figure 2:
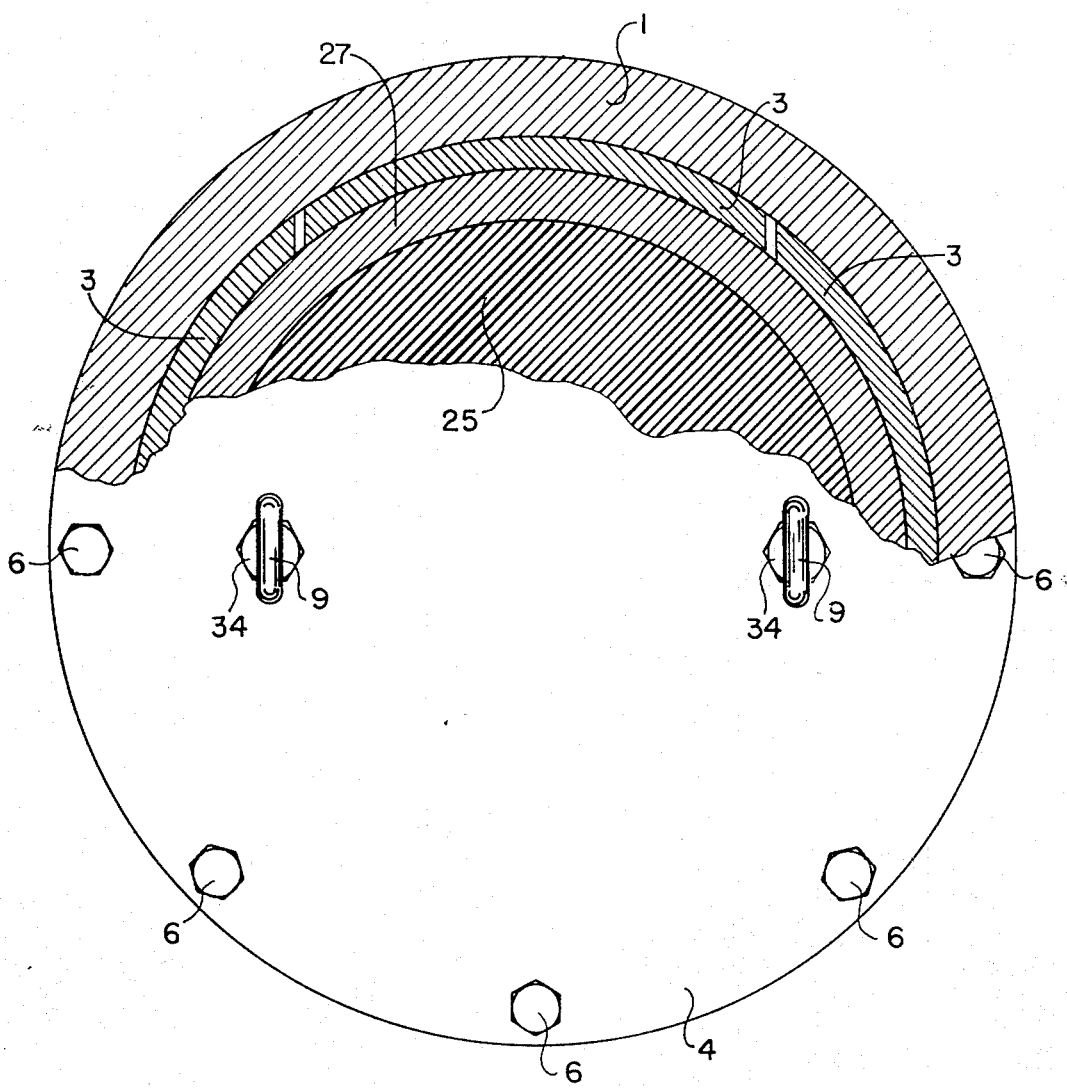
FIG. 2 is a combined end view of the accumulator of FIG. 1, and a partial section taken along the line 2—2 of FIG. 1.
Figure 3:
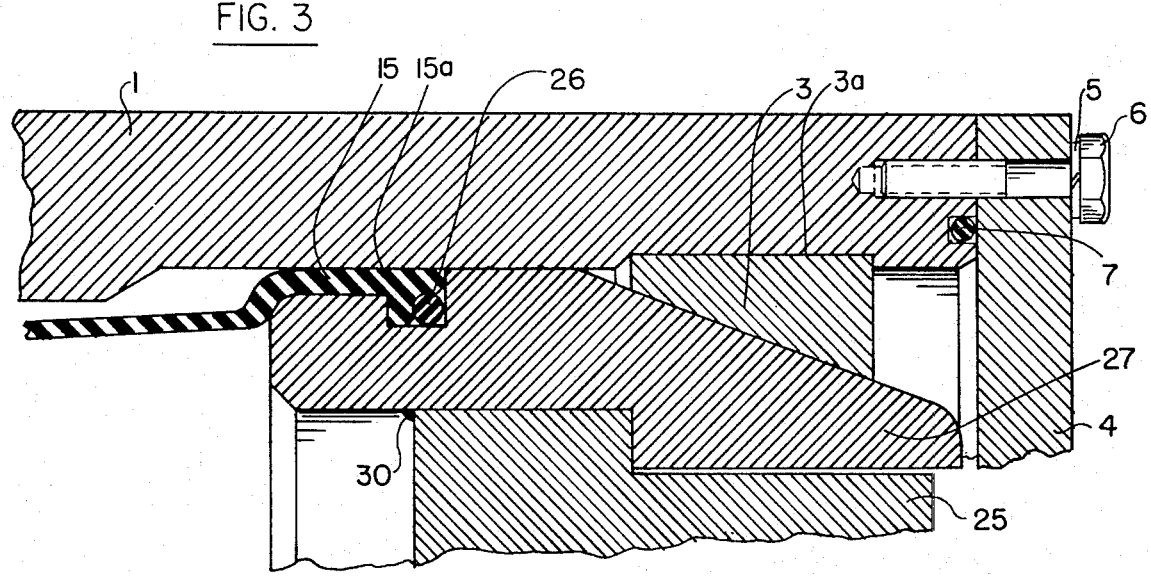
FIGS. 3 and 4 are enlarged detail views of portions of the side section of FIG. 1.

The tapered locking ring 3 is formed in four segments, as shown partially in FIG. 2. The annular ring 27 has its peripheral surface inclined longitudinally, as best shown in FIGS. 1 and 3, so as to present a mating surface to the inclined surface of the locking ring 3. The locking ring 3 is supported in an internal groove 3A which is machined into the peripheral surface of shell 1 adjacent its open end.

A cover plate 4 is mounted on the open end of shell 1 by a series of screws 6 which are threaded into the end of the shell, each of which has a spring-loaded lock washer 5 around its head, as shown. An O-ring seal 7 is also provided to seal the cover plate 5 to the end of the shell. Two lifting eye bolts 9 pass through cover plate 5 and are screws into the cap 25. Each eye bolt is sealed to the cover plate 4 by a nut 34. Each nut is fitted with an O-ring 8, as shown in FIG. 1.

A gas precharge valve is provided in the cap 25, and it comprises a poppet 12, containing a seal 11, and a spring 13, secured by a plug 14. Plug 14 contains holes 14A, through which gas can be precharged or exhausted from the gas chamber. A threaded closure cap 10, sealed with an O-ring 10A, is mounted on the cap 25, which normally covers and encloses the precharge gas valve.

A poppet valve 16 is mounted in the liquid port at the other end of shell 1, and it is spring-biased to the right in FIG. 1 by an appropriate spring 17. When the thimble-shaped bladder 2 is forced against the end of poppet 16, it forces the poppet inwardly against a seat 18 at the inner edge of the liquid port.

Figure 4:
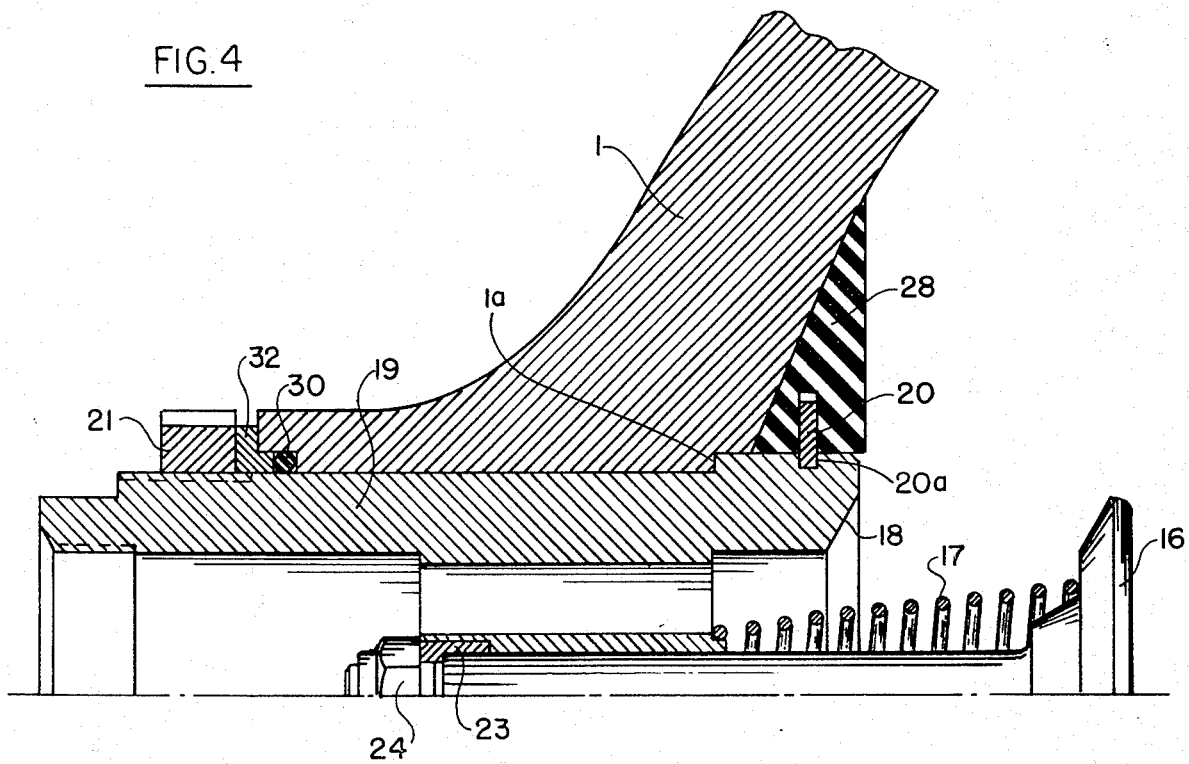

The poppet is contained in a plug 19 which is held in the liquid port by means of a shoulder formed on the plug by an enlarged outer diameter at its inner end. The shoulder engages a shoulder 1A in the liquid port, as shown in FIGS. 1 and 4. The plug 19 is held in place by means of a lock nut 21. The lock nut engages a collar 32 which, in turn, engages an O-ring 30, providing a seal between the plug 19, and the exterior of the assembly. A piston 23 is mounted on the poppet 16, and is held in place by an elastic stop nut 24. A grommet 28 formed of synthetic rubber, or other suitable material, is provided. The grommet serves to make up for the tolerances and irregularities in the inner surface of the mouth of the shell 1. A snap ring 20 is placed inside the grommet 28, and is then snapped over the enlarged shoulder of the plug 19, and snaps into position in a groove 20A provided in the periphery of the enlarged diameter of the plug 19.

As mentioned above, the cover plate 4 and its seals reprovided to permit the accumulator to be mounted, for example, on the ocean floor. Such an installation could involve water pressures up to 1500 psi which, without the cover plate 4, the water pressure would tend to push the cap 25 into the interior of the accmulator shell 1.

As also described above, the closure cap 10 closes off and seals the gas precharge valve, the gas precharge valve being a check valve containing the poppet 12, and sealed with the O-ring 11. The plug 14 contains several orifices through which the gas precharge can enter the interior of the bladder.

The illustrated valve is used because of the large size of the accumulator which renders it extremely difficult to precharge or discharge its gas precharge chamber through the very small orifices of the automotive type of gas valves heretofore used in the smaller prior art accumulators. The orifices must be sufficiently large so that the pressure drop in charging or discharging the gas precharge chamber occurs relatively rapidly and without the creation of adverse thermal conditions.

As described, the annular member 27 and cap 25 are locked in position by the tapered locking ring 3 which is made in four segments and which is set in position in the groove machined in the inner periphery of the wall of shell 1. Because of the inclined plane of the member 27 and the inclined configuration of the tapered locking ring 3, the loads are distributed radially as well as longitudinally. This construction permits the accumulator to handle large pressures without any tendency for the cap 25 to be forced out through the open end of the shell.

As described above, the bladder 2 is thimble-shaped, and it can be modled in one piece. Such construction permits a tapered wall thickness to be molded reliably so that at any point around the periphery of the bladder, the walls will expand continuously toward the spherical end of the bladder.

The mouth of the bladder is constructed to provide reliability for sealing the gas pressure in the gas precharge chamber from the oil pressure in the liquid chamber. In a constructed embodiment, the rim around the mouth of the bladder was made somewhat greater than an annular groove formed at the inner edge of the cap 25 between the cap and the inner surface of shell 1. The end of the bladder is provided with a step configuration, as shown, to prevent the bladder from pulling itself out of the groove as it stretches. The material of the bladder is locked into the groove by both the squeezing force of the cap, and by the mechanical step.

In the large sizes and heavy weights encountered in these larger accumulators, it is extremely difficult if not impossible to machine dimensional tolerances on both the annular member 27, and the shell 1, so that the rubber in the bladder 2, can be properly compressed to form a seal. It is therefore necessary that the bladder 10, is molded so that its mouth must be stretched about 5% to fit into the groove at the inner edge of the annular member 27. The O-ring 26 is mounted in the groove as described above. The O-ring imparts a radial outward thrust component to press the outer surface of the bladder mouth against the inner surface 15A of shell 1 to impart a sealing surface. A non-hardening and non-bonding sealing agent may be painted onto the lip at the inner edge of the cap. A compound presently on the market and referred to as "Pro-Seal" as presently being used to seal gasoline wing tanks on aircraft is appropriate for this purpose.

As mentioned above, the poppet assembly in the liquid port of the shell also is unique. It is very important from a safety standpoint that no part of the accumulator may be removed while the accumulator contains a precharge. This safety requirement is met in the construction of FIG. 1, providing the plug 19 which can be assembled only by removing the lock nut 21, and by pushing the plug and the poppet assembly inwardly into the interior of the shell 10, and this may be achieved only when there is no gas precharge within the shell.

Since the accumular shown in FIGS. 1-4 may be relatively large, it is desirable to permit replacement of the bladder to be achieved without the need to remove the accumulator from the equipment in which it is sintalled. This replacement is relatively simple with the construction of the present invention, since it entails merely the removal of screws 6, and the withdrawal of the cap 25, annular member 27 and bladder 10 from the open end of the shell 1, after the segmented locking ring 3 has been removed. To achieve the withdrawal, the cap 25 and annular member 27 are first pushed into the shell 1 to release the segmented locking ring 3 which then can be removed.

The invention provides, therefore, an improved construction for a pressure accumulator which is particularly adaptable to large sized accumulators of this general type. It will be appreciated that while a particular embodiment has been shown and described, modifications may be made. It is intended in the claims to cover the modifications which come within the spirit and scope of the invention.

What is claimed is:

1. In a pressure accumulator which includes an elongated rigid shell open at one end and having a port formed in the other end thereof; cap means mounted in and enclosing the open end of the shell; a segmented tapered ring fitted into an internal groove at the open end of the shell and engaging the peripheral surface of the cap means for retaining the cap means in the shell; a thimble-shaped flexible bladder positioned in the shell and having a mouth and a rim surrounding said mouth, said mouth being sealed to the inner surface of the shell by the inner peripheral edge of the cap means; and a gas pre-charge valve mounted in said cap means to introduce gas into the interior of said bladder a poppet valve mounted in the port in the other end of the shell, and wherein the cap means comprises a cap having a peripheral shoulder, and a concentric annular member surrounding the cap, said annular member also having a peripheral shoulder engaging the peripheral shoulder on said cap, and said annular member having a longitudinally inclined peripheral surface engaging the adjacent surface of the tapered ring.

2. The combination defined in claim 1, and which includes a cover plate secured to the open end of the shell and to the cap means for preventing the cap means from being forced into the interior of the shell by external pressure.

3. The combination defined in claim 2, in which the cover plate is sealed to prevent leakage from external pressure.

4. The combination defined in claim 1, in which the rim of the bladder surrounding the mouth thereof is received in a peripheral groove formed at the inner edge of the cap means, and which includes an O-ring mounted in the groove for forcing the rim of the bladder radially outwardly against the inner surface of the shell.

5. The combination defined in claim 1, and which includes a tubular plug mounted in the port in coaxial relationship with said poppet valve, the plug having a shoulder thereon which engages an internal shoulder in the port to prevent the plug from moving inwardly through the port, and a lock nut threaded to the outer end of the plug for holding the plug against the last-named shoulder so that the plug cannot be pushed into the accumulator.

6. The combination defined in claim 5, in which a seal is provided between the plug and the wall of the port to prevent leakage.

7. The combination defined in claim 5, and which includes a flexible deformable grommet mounted on the inner end of the plug and engaging the inner surface of the shell surrounding said port.

8. The combination defined in claim 7, and which includes a snap ring imbedded into the grommet so that the grommet can be snapped into the plug and held permanently in place.

* * * * *